Oct. 28, 1941.  W. J. RUSSELL  2,260,790
HEATING UNIT
Filed March 29, 1939  5 Sheets-Sheet 1

WITNESSES:

INVENTOR
William J. Russell.
BY
ATTORNEY

Oct. 28, 1941.    W. J. RUSSELL    2,260,790
HEATING UNIT
Filed March 29, 1939    5 Sheets-Sheet 2

WITNESSES:
Leon M. Garman
H.C. Hepler

INVENTOR
William J. Russell.
BY
W R Coley
ATTORNEY

Oct. 28, 1941.  W. J. RUSSELL  2,260,790
HEATING UNIT
Filed March 29, 1939  5 Sheets-Sheet 3
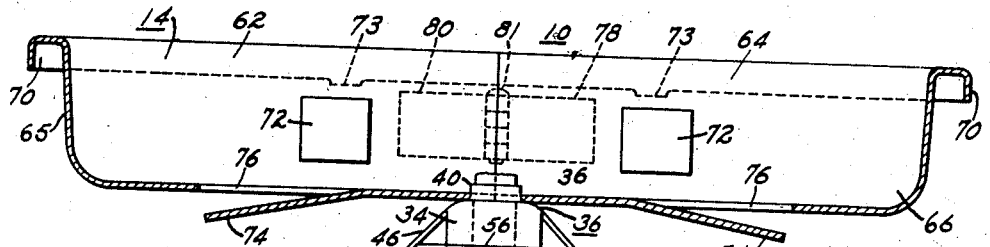
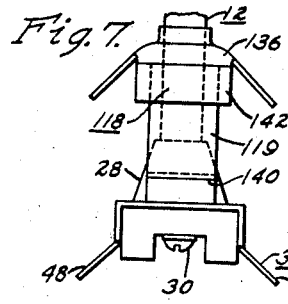
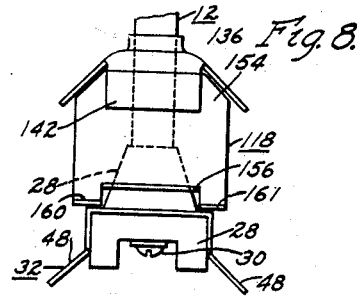
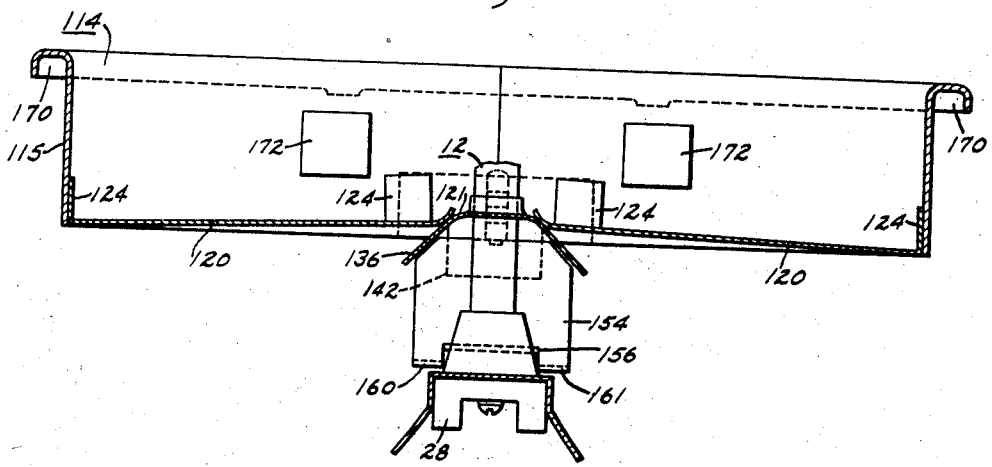
WITNESSES:
Leon M. Garman
H. C. Hepler
INVENTOR
William J. Russell.
BY
W. R. Coley
ATTORNEY

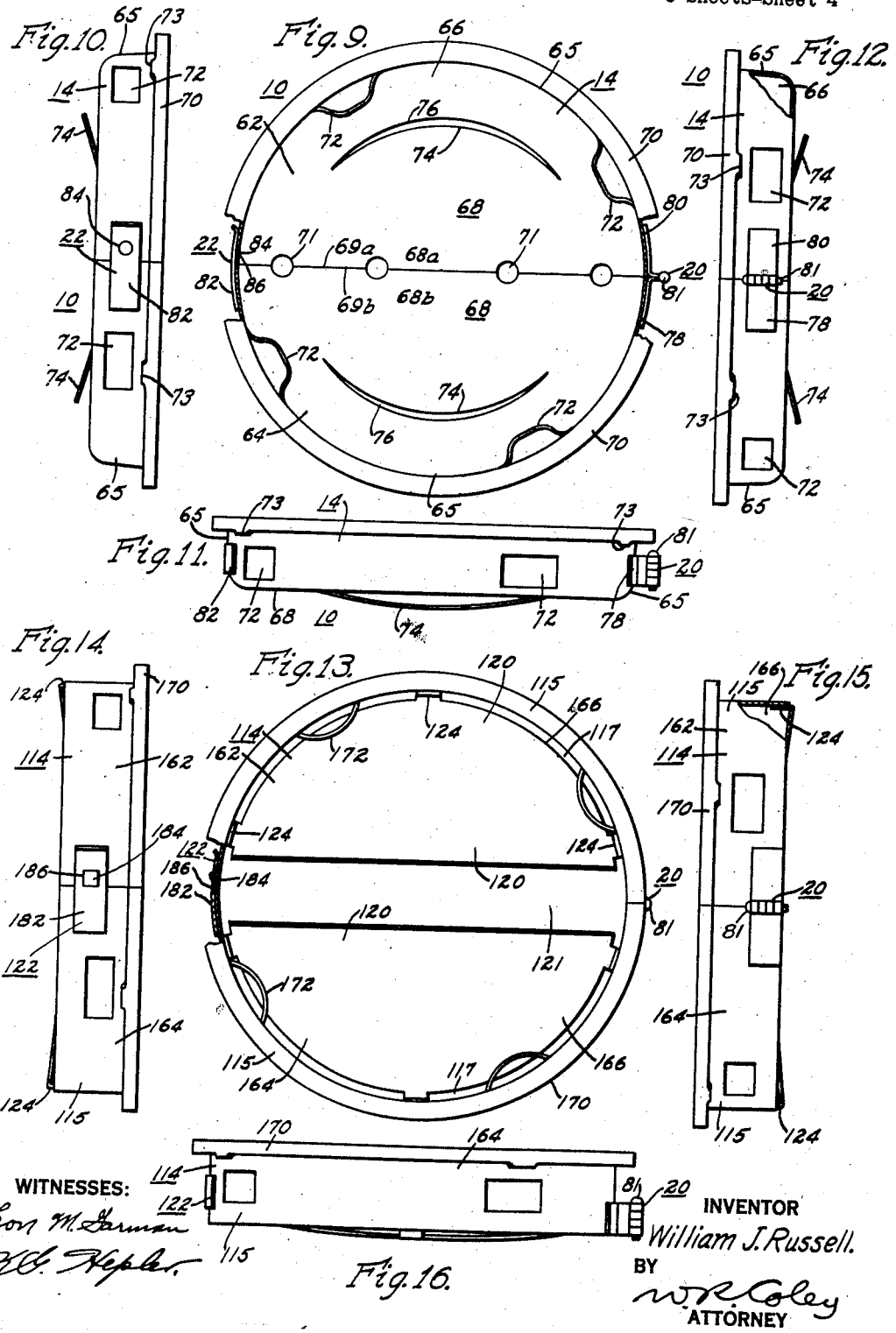

Oct. 28, 1941. W. J. RUSSELL 2,260,790
HEATING UNIT
Filed March 29, 1939 5 Sheets-Sheet 5
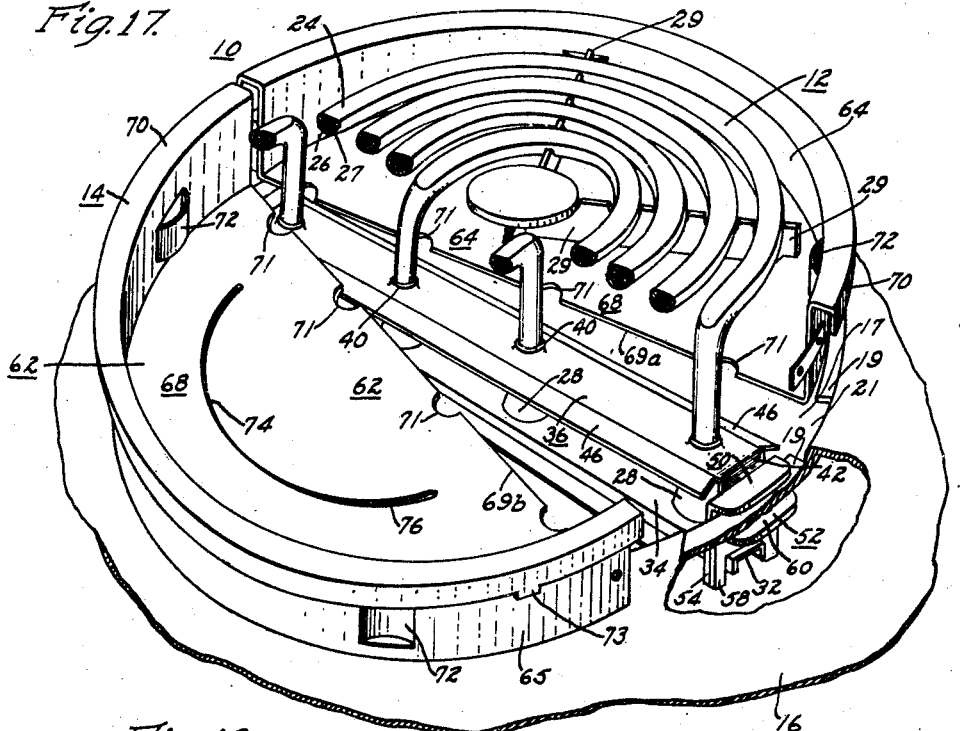
INVENTOR
William J. Russell.
BY
ATTORNEY Patented Oct. 28, 1941

2,260,790

UNITED STATES PATENT OFFICE 2,260,790

HEATING UNIT

William J. Russell, Mansfield, Ohio, assignor to Westinghouse Electric & Manufacturing Company, East Pittsburgh, Pa., a corporation of Pennsylvania Application March 29, 1939, Serial No. 264,775

5 Claims. (Cl. 219—37)

My invention relates to heating units and more particularly to an easily cleanable, open-type surface unit for electric ranges.

There has been considerable effort expended in the past to develop and produce an open grid-type range surface unit having a drip-pan or shield associated therewith which, upon getting dirty and contaminated with continued use, could be easily cleaned. However, an inspection of the prior art indicates that, while there have been many ingenious attempts to provide an easily cleanable pan or shield, no pan or shield has heretofore been, in any manner whatsoever, easily and at the same time thoroughly cleanable.

Those skilled in the art will readily appreciate the commercial and sanitary advantages of a range surface unit having an easily cleanable drip-pan or shield. In addition, provision for easily and quickly removing such pan or shield from the unit whereby an operator could place the pan or shield in the dishpan and thoroughly wash it whenever needed would produce even greater commercial and sanitary advantages.

It is, therefore, an object of my invention to provide a range surface unit having a simple, inexpensive, rugged, dependable, easily removable drip-pan or shield which an operator may quickly remove from the unit to permit thorough cleaning thereof.

A further object of my invention is to provide a range surface unit including a heating element and pan structure which may be retained in an elevated position above the surface of the range platform to permit adequate cleaning of the element and pan structure.

Another object of my invention is to provide retaining means integral with a range surface unit structure which is adapted to retain or support the structure in an elevated position above the range platform.

A still further object of my invention is to provide a pan structure adapted to support a heating unit upon a platform during normal use thereof and to be readily removed therefrom when the unit has been displaced for cleaning purposes.

Another object of my invention is to provide a heating unit support having a bottom with louvers therein which permit the free passage of sloppage or spillage therethrough.

A further object of my invention is to provide a support for a heating unit which includes cooperating sections and means for retaining the sections in cooperative engagement and for permitting the removal of the support from the heating unit.

Still another object of my invention is to provide a heating unit having a removable support with bottom sections and a terminal shield attached to the unit adapted to bridge any gap between the bottom sections to prevent any spillage from contacting the unit terminals.

Still a further object of my invention is to provide a supporting pan structure having portions adapted to be rotated about an axis inclined to the plane of such structure.

Another object of my invention is to provide a pan structure having hinged portions adapted to be rotated about a hinge pin the axis of which does not intersect the structure at any point.

Other objects of my invention will either be pointed out specifically in the course of the following description of a device embodying my invention, or will be apparent from such description.

In the accompanying drawings:

Fig. 5 is a sectional view taken along the line V—V of Fig. 2;

Fig. 6 is a sectional view taken along the line VI—VI of Fig. 4;

Figs. 7 and 8 are views taken along the lines VII—VII and VIII—VIII of Fig. 3, respectively;

Fig. 9 is a top plan view illustrating the pan structure shown in Figs. 1, 2 and 5;

Figs. 10, 11 and 12 are side elevational views of the supporting pan structure shown in Fig. 9;

Fig. 13 is a top plan view of the supporting pan shown in Figs. 3, 4 and 6.

Figs. 14, 15 and 16 are side elevational views of the supporting pan shown in Fig. 13;

Fig. 17 is a perspective view of the heating unit shown in Fig. 1 in its elevated position with the heating element and pan structure thereof retained above the range platform and with the supporting pan structure partially removed from the heating element;

Fig. 18 is a partial sectional view similar to Fig. 3 illustrating a unit having a modified pan structure;

Fig. 19 is a partial elevational view of the unit illustrated in Fig. 18; and,

Fig. 20 is a side elevational view of the unit of Fig. 18 shown in its elevated position, illustrating the removal of the modified pan structure.

Figure 1:
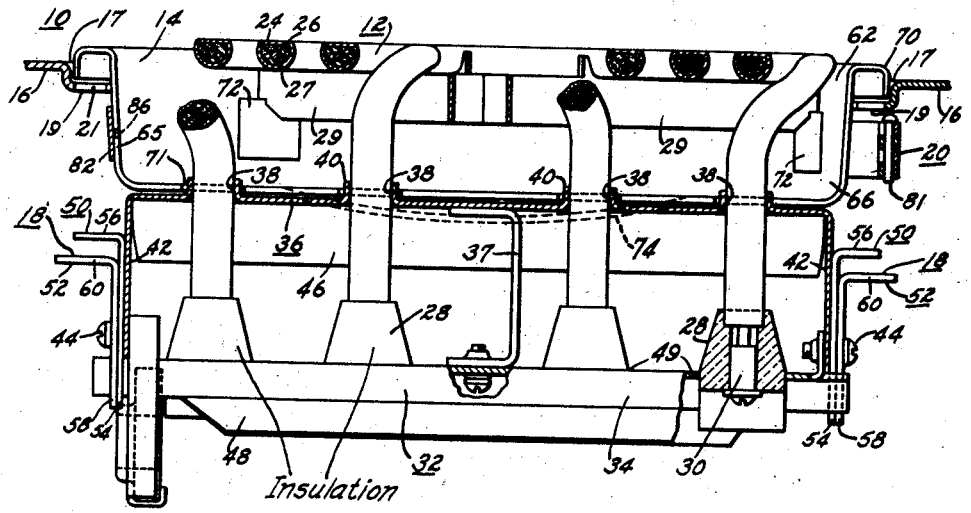
Figures 1 and 2 are sectional views of a device embodying my invention in its normal operating position and in its elevated or cleaning position, respectively.

Referring to the accompanying drawings, in which like reference characters indicate like parts in the several figures, I show, with special reference to Figs. 1, 2, 5, 9 to 12, inclusive, and 17, a range surface heating unit 10, including a heating element 12 and a supporting pan structure 14 adapted to be supported on a range platform, hot plate surface, or the like 16 during the normal operations of such unit, and to be positioned above the platform 16 by means of a suitable retaining or elevating support structure 18 when it is desired to clean such unit. The pan structure 14 is retained in cooperative engagement about the heating element 12 by means of a suitable hinge structure 20 and latching clip structure 22.

The heating element 12, in this instance, comprises an open grid formed of two sheathed members arranged in a spiral. The sheathed members each comprise a resistor 26 embedded within suitable insulating material 27 surrounded by a metal sheath 24 in a well known manner. The insulating material 27 is preferably magnesium oxide or the like, and may be positioned within the metallic envelope 24 in a powdered form. The metallic sheath is formed of any suitable material which will permit the heating element 12 to operate satisfactorily at a high temperature corresponding to red heat.

The sheathed members are formed into two separate substantially concentric spirals, and may be of either similar or varying wattages. The substantially concentric spirals are mounted in and attached to suitable radially extending, transversely grooved supporting arms 29 in a well known manner. These arms are adapted to be supported within the pan structure 14 in a manner hereinafter described.

It is to be understood that the heating element 12 described herein and illustrated in the accompanying drawings is used primarily for illustrative purposes, and that any other suitable heating element may be used in lieu thereof.

The ends of the tubular sheathed members extend downwardly from the main plane of the heating element 12 and terminate within suitable refractory insulating bushings 28. Suitable terminals 30 are located at the lower ends of the sheathed members within the bushings 28 to afford means for connecting the heating element 12 to a supply circuit (not shown). The bushings 28 are attached to a terminal block 32 which, in this instance, comprises an elongated inverted channel-like member 34 having outwardly and downwardly sloping sides 48. The channel 34 is formed from any suitable metallic sheet and has formed therein a plurality of apertures 49 along the upper surface thereof for permitting the passage and retention of the bushings 28.

A terminal shield 36 is positioned intermediate the heating element 12 and the terminal block 32, and extends substantially diametrically across the heating unit 10. The terminal shield 36 is substantially an elongated inverted channel having outwardly and downwardly sloping sides 46 and a plurality of apertures 38 located within the upper surface thereof to afford suitable passage for the depending ends of the heating element 12. Upwardly extending collars 40 may be located about the apertures 38 to form small vertical sleeves through which the depending ends of the heating element pass. These collars 40 may be swedged tightly against the metallic sheathed heating members to prevent passage of liquids along the surface of the depending ends of such members and to retain the members in position as a functionally integral heating element.

Depending end portions 42 are, in this instance, located at either end of the terminal shield 36 to afford means for rigidly attaching the terminal block 32 thereto by means of suitable screws 44. However, an additional U-shaped member 37 is rigidly attached to the terminal shield 36 near its central portion and removably attached to the terminal block 32 to more firmly secure the two members together.

The sloping sides 46, being a part of the terminal shield 36, direct any spillage or sloppage which may pass through the open heating element 12 outwardly away from the lower or terminal ends of the heating element 12. This structure thus adequately protects the terminals and insulating bushings 28 from any extraneous matter which may pass down through the unit 10 and along the depending ends of the sheathed members thereof.

With the collars 40 of the terminal shield 36 rigidly attached to the heating element 12 and with the terminal block 32 attached to the terminal shield 36, it follows that such members combine to form a rigid or functionally integral structure. Accordingly, it follows that if the heating element 12 be bodily moved in a manner as hereinafter described, the terminal shield 36 and terminal block 32 will be moved therewith.

The supporting pan structure 14, in this instance, comprises two half pan structures 62 and 64 which cooperate to form an open pan-like structure or vessel having a depressed central portion 66 with a substantially horizontally disposed bottom 68 and an overhanging lip or flange 70 which is located about the upper periphery of the pan structure 14 (half pan structures 62 and 64) to afford means for supporting such pan structure within apertures 17 in the range platform 16, as hereinafter described. Suitable depending lugs 73 are integral with the flange 70 and, when the unit 10 is resting upon the supporting platform 16 in a normal operating position, retain such flange slightly above the supporting flange 19 of platform 16 to restrict the flow of heat therebetween. The two half pan structures 62 and 64 are vertically hinged together at one end by means of the hinge structure 20, and are retained in a cooperative engagement, so as to form the illustrated substantially open pan structure, by means of a suitable clip structure 22. However, it is to be understood that any other suitable pan structure may be used in lieu of pan structure 14, some of which are hereinafter described.

The half pan structures 62 and 64 have semi-cylindrical sides 65 with horizontally positioned substantially semicircular bottom portions 68a and 68b. The portions 68a and 68b are, in this instance, formed integral with the respective sides 65. However, they may be formed as separate items and may then be rigidly attached to the sides 65 or they may be loosely positioned within such sides. The diametrical internal edges 69a and 69b of the bottom portions 68a and 68b, when the half pan structures 62 and 64 are in cooperative engagement, may abut against or overlap each other.

A plurality of semicircular notches 71 are cut within the abutting edges 69a and 69b of the bottoms 68a and 68b. These notches 71 cooperate to form substantially circular apertures within the bottom 68 of the pan structure 14 when the two half pan structures 62 and 64 are cooperatively engaged. The circular apertures are located along the abutting edges of the pan structures 62 and 64 in such manner as to encase or permit the passage of the depending ends of the heating element 12 through the pan structure 14, and to permit the pan structure to be located about the heating element 12.

Inwardly extending ledges or lugs 72 are either struck out from the sides 65 of the half pan structures 62 and 64 or are rigidly attached thereto. These ledges 72 afford means for supporting the heating element 12 by permitting the radially extending arms 29 to rest thereon, in a well known manner.

The hinge structure 20 which rotatively attaches the two half pan structures 62 and 64 together to form the hinged pan structure 14 comprises, in this instance, two elongated arcuate members 78 and 80 (see Fig. 9). These members are rigidly attached to the sides 65 of the pan structures 62 and 66 by spot welding, for example. However, such hinges may be formed integral with the sides 65. The cooperating or hinging ends thereof are displaced outward radially from the sides of the half pans 62 and 64 to a position either corresponding to or beyond the outermost point of the supporting ledge or lip 70 and are retained in cooperative engagement by a hinge-pin 81. The two half pan structures 62 and 64 may thus be rotated about the pin 81 of the hinge structure 20 as an axis without causing any binding action at the ledge 70, since all points of each wall of the ledge swing away from each other.

With the hinge pin 81 positioned outside the main pan structure, it follows that to permit the free passage of the hinge 20 as the unit 10 is located within the aperture 17, the unit must be tilted as it passes through the aperture.

The pan structure 14 is thus adapted to be located about the heating element 12 and to support such element as described, and therefore, to catch any sloppage or spilled material which may pass through the grid-like heating element 12. However, this extraneous material is readily drained from the pan-structure 14 by downwardly and outwardly extending arcuate louvers 74 which are positioned, in this instance, one within each of the bottom portions 68a and 68b of the half pan structures 62 and 64. These louvers 74 are formed within the substantially horizontal bottom portions of the supporting pans 62 and 64 by having arcuate slots or apertures 76 cut therein with the inner portion of the bottom 68 pushed outwardly or downwardly.

The latching clip structure 22, which retains the two half pan structures 62 and 64 in cooperative engagement, comprises, in this instance, an elongated finger 82 which is rigidly attached to one half pan structure, say 64, (see Fig. 9). The free end of the finger 82 is bent outwardly to permit free cooperation with the second pan structure 66. An inwardly extending boss 84 is formed within the finger 82 to cooperate with an aperture 36 in the side wall of the second half pan structure 66.

The latching clip structure 22, through the cooperation of boss 84 within aperture 86, thus affords means for retaining the two half pan structures 62 and 64 in a cooperative engagement about the heating element 12 in a manner hereinafter described. Further, the hinge structure 22 affords means for permitting the two half pan structures 62 and 64 to be rotatively separated and to be easily removed from the heating element 12 in a manner hereinafter described.

The range platform, hot plate surface, or the like 16 is adapted to support the surface unit 10, including the supporting pan structure 14 in the usual well known manner. Apertures 17, which are circular in this instance, are located within the supporting platforms within which the surface units 10 are retained, preferably, slightly above the surface of the platform during the normal operations of such units. Inwardly extending flanges or ledges 19 are located within the apertures 17 for supporting the surface unit 10 by means of the pan structure 14 in a well known manner. Two notches 21 are located within the flange or ledge 19 substantially diametrically opposite to each other (see Figs. 1 and 17) for permitting the retaining or elevating supporting structure 18 to pass upwardly therethrough, whereby the surface unit structure 10 may be bodily moved upwardly and rotated within the aperture 17, as hereinafter described. It is to be understood that the number of notches 21 located within the flange will vary with the type of elevating support structure used, and may, in some instances, not be needed at all or may be more than two in number.

Figure 2:
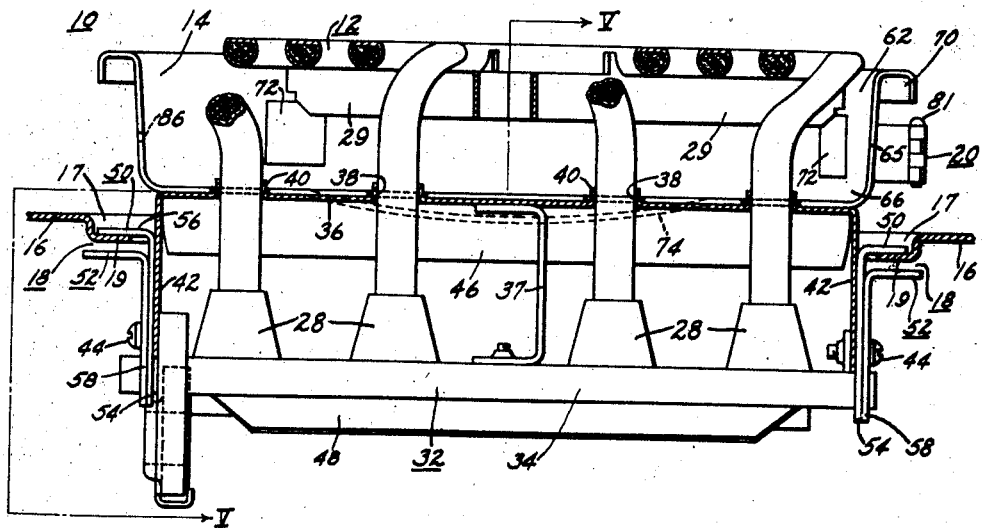

The retaining or elevating support structures 18, one on either end of the terminal shield 36, which support the surface unit 10 in an elevated position above the range platform, comprise, in this instance, two inverted L-shaped members 50 and 52 which are rigidly attached to the terminal shield 36 and terminal block 32 by means of the screw 44 (see Figs. 1, 2 and 5). The L-shaped members 50, one on either end of the terminal shield 36, have a vertically extending portion 54 and a relatively short horizontally extending portion 56. In a similar manner, the L-shaped members 52 have a vertical portion 58 and a relatively short horizontal portion 60. The L-shaped members 50 and 52 are, in this instance, rigidly attached to the terminal shield 36 and terminal block 32 by means of the screws 44 extending through the vertical portions 54 and 58, respectively, thereof. The vertical portions 54 of the L-shaped members 50 are somewhat longer than the vertical portions 58 of the L-shaped members 52, and the horizontal portions 56 of L-shaped members 50 are shorter than the horizontal portions 60 of L-shaped members 52. Accordingly, it follows that with the lower ends of the vertical portions 54 and 58 being in juxtaposition, the horizontal portions 56 are located above the horizontal portions 60 of L-shaped members 52, and that the portions 60 extend outwardly a greater distance than the horizontal portions 56. It is, therefore, obvious that the elevating supporting structure 18 comprises two members or supporting ears namely, the horizontal portions 56 and 60, of unequal radial lengths, with the upper members or ears being substantially shorter than the lower members or ears.

The diametrical distance between the outermost edges of the upper horizontal portions 56 is slightly less than the distance across the opening 17 in the range platform 16. Conversely, the diametrical distance between the outermost edges of the lower horizontal portions 60 is greater than the distance across the opening 17 in the range platform. These cooperative features thus permit the upper or shorter horizontal portions 56, as the unit 10 is raised, to be bodily moved through the notches 21 in the inwardly extending ledge 19 of the opening 17 in the range platform 16, while the lower or larger portions 60 remain below the ledge 19. The unit 10 after being raised to its elevated position in such a manner may then be rotated within the opening 17, whereupon the upper portions 56 will retain the surface unit 10 in a displaced position above the range platform, while the lower portions 60, being located slightly below the ledge 19, will prevent the unit from tilting.

When assembling the surface unit 10 embodying my invention, the heating element 12, formed in any well known manner with suitable terminals 30 attached to the depending free ends thereof, with the bushings 28 associated therewith, has the terminal shield 36 mounted on said ends and, if desired, rigidly attached thereto by swedging the collars 40 thereof tightly against the depending ends. The terminal block 32, associated with the bushings 28, may then be rigidly attached to the terminal shield 36 by the U-shaped member 37 and the depending ends 42 thereof. The elevating support structures or ear assemblies 18 are rigidly attached to the terminal shield 36 and terminal block 32 by means of the screws 44, which likewise rigidly attach the depending ends 42 of such terminal shield 36 to the terminal block 32. The heating element 12, terminal block 32, terminal shield 36 and supporting ears 18 (50 and 52) are thus functionally an integral structure and may be bodily moved as a unit. The hinged sectional supporting pan structure 14 may then be located about the heating element 12, as shown, completing the surface unit 10. With the pan structure 14 located about the heating element 12, the bottom thereof extends, in this instance, intermediate the heating element 12 and the terminal shield 36. The latching clip structure 22 retains such pan structure 14 in cooperative engagement as a functionally integral structure about the heating element 12.

The depending lugs 73, integral with the flange or lip 70 of the pan structure retain the surface unit 10 upon the ledge 19 of platform 16, while the radial arms 29 of the heating element 12 retain such element within the pan structure 14 by resting upon the inwardly extending lugs 72 thereof when the heating element is mounted upon the range platform 16 in its normal operating position.

When the surface unit 10 is retained in an elevated position above the surface of range platform 16 or the like (see Figs. 2, 5 and 17), for cleaning purposes, the upper horizontal portions 56 of the ear assemblies 18 rest upon the upper surface of the ledges 19, as previously set forth. The heating element 12 is thus retained in an elevated position above the range platform 16, as shown in Fig. 2. The pan structure 14, being positioned about the element 12, is also retained above the range platform where it may be easily removed from such heating element. It will be noted that, when the surface unit 10 is in the elevated position, the pan structure 14 rests upon the terminal shield 36 (see Figs. 2 and 5). The radial arms 29 thus do not rest upon the lugs 72. However, the heating element 12 is retained in its elevated position due to its rigid connection with the terminal shield 36 and ear structure 18. The pan structure 14 may thus be easily removed from the heating element 12, as hereinafter more fully described, without impairing the retention of the elevated position of such element 12.

When it is desired to thoroughly clean the surface unit 10, with such unit in its normal operating position upon the supporting platform, an operator merely grasps the heating element and bodily lifts the unit through the aperture 17. The upper ears 56 of retaining or elevating support structure 18 then pass through the notches 21 in ledge 19 until lower ears 60 engage the lower sides of the ledge. The unit is then slightly rotated in either direction within the aperture. The ledge 19, after such rotation, retains the unit in an elevated or cleaning position by reason of upper ears 56 resting upon such ledge.

The pan structure 14 and heating element 12 are thus elevated somewhat above the surface of the supporting platform, (see Fig. 2) whereupon such pan structure may be readily removed from about the heating element. To do this the operator grasps the half pan structures 62 and 64 at a point opposite the hinge structure 20 and, unlatching the latching clip structure 22, pulls the structures apart as they rotate about the hinge pin 81 as an axis (see Fig. 17). The pan structure 14 is then merely lifted from the element 12 and placed in, say, a dish pan, where it may be thoroughly cleaned.

In addition, any extraneous material which may have adhered to the heating element 12 and terminal shield 36 may likewise be easily and completely removed therefrom while the pan structure 14 is removed and the heating element and terminal shield are in the elevated position.

After thoroughly cleaning the unit 10, the pan structure may be again positioned about the element 12 with the bottom 68 thereof located intermediate the element and terminal shield 36. With the latching structure 22 again in closed position, such structure and the hinge structure 20 retain the pan structure in operative engagement about the element 12 in such a manner that the pan structure may again support the heating element 12 upon the supporting platform.

With the pan structure thus again positioned about the heating element, the unit may be rotated back to its original position so as to permit the upper ears of elevating support structure 18 to pass downwardly through notches 21 in ledge 19. The upper flange 70 on pan structure 14 then rests upon the ledge 19 of the supporting platform 16 to retain the unit in its normal operating position substantially in the plane of such platform, as shown in Fig. 1.

Referring more particularly to Figs. 3, 4, 6 and 13 to 16, inclusive, I show a modified surface heating unit 11, including the heating element 12, a terminal block 132, a modified pan structure 114, a slightly modified terminal shield 136, and a modified elevating supporting ear structure 118 cooperating with an elevating supporting spring clip structure 119 to support the surface unit 11 in an elevated position above a supporting range platform or the like 16.

The modified supporting pan structure 114 is adapted to retain the heating element 12 substantially in the plane of the range platform 16 in a manner hereinabove described, while the supporting ear structure 118 and clip structure 119 are adapted to cooperate with the range platform 16 or the like to retain the heating element 12 in an elevated position above the range platform, permitting the removal of the pan structure 114 whereby such pan structure and heating element may be easily cleaned.

The pan structure 114 comprises, in this instance, two half pan structures 162 and 164 each comprising a substantially semicircular or ring-like member 115 adapted to be cooperatively retained together by means of the hinge structure 20 and a modified supporting clip structure 122, and segmentally shaped bottom portions 120 which are, in this instance, rigidly attached to the respective ring-like members 115 to form a suitable spillage-directing bottom for the supporting pan structure 114.

The ring-like members 115 plus the segmentally shaped bottoms unite to form an open pan-like structure or vessel having a depressed central portion 166. An over-hanging lip or flange 170 is located about the upper periphery of the ring-like members 115 to afford means for supporting the modified pan structure 114 within the aperture 17 in the range platform, or the like, similar to lip 70 of pan structure 14 as previously described. The modified two half pan structures 162 and 164 are hinged together by the hinge structure 20 similar to the half pan structures 62 and 64 hereinabove described.

The segmental bottoms 120 are, in this instance, rigidly attached to and slightly displaced from the semi-cylindrical ring-like members 115 by means of outwardly and upwardly extending tabs 124. The tabs 124 are preferably integral with the bottoms 120 and may be spot welded or rigidly attached to the lower portions of the rings 115 in any other desired manner. The tabs 124 retain the segmental bottoms 120 slightly inwardly from the ring-like member 115, forming an arcuate space 117 therebetween, and, in addition, retain the bottoms at preferably a slightly downwardly sloping angle from the diametrical division between the half pan structures 162 and 164. In other words, each of the segmental bottoms 120 slope from their innermost edge to the respective ring-like members 115 in substantially a uniform plane.

Accordingly, any spillage or extraneous matter passing through the open grid-type heating element 12 falling upon the bottoms 120 will be directed outwardly towards the rings 115 and away from the terminal shield 36. Such extraneous matter will freely pass through the arcuate space 117 between the arcuate outer edge of the segmental bottoms 120 and the ring-like members 115.

The space between the bottoms 120 and the ring-like members 115, in addition to permitting the passage of extraneous matter therethrough, retards or prevents the flow of heat from the bottoms 120 to the side members 115 of the pan structure 114. This feature thus enables the side members 115 to operate at a lower temperature, than when the bottoms engage such side members, as hereinabove described.

It is to be understood that the segmental bottoms 120 may be of any desired size, being either rigidly attached to the ring-like members 115 through tabs 124 or loosely associated therewith by resting upon such tabs or the like, and that such bottoms may vary in their radial widths, depending upon the width of the cooperating terminal shield 36. In other words, there may be a substantially uniform rectangular gap 121 between the two segmental bottoms 120 above the cooperating terminal shield 36, as indicated by Figs. 6 and 13. The top surface of the shield 36 and the segmental bottoms 120 thus unite to form a bottom for the pan structure 114. Inasmuch as the rectangular gap 121 is located along the line dividing the two semi-cylindrical ring-like members 115 and is positioned substantially above the terminal shield 36 in line with the depending ends of heating element 12, such gap affords ample space for the passage of the lower or depending ends of the heating element 12 to pass therethrough.

Inwardly extending ledges 172 similar to ledges 72 in the pan structure 14 are also either formed within the ring-like members 115 or are rigidly attached thereto. These ledges 172 also afford means for supporting the heating element 12 through the cooperation of the radially extending arms 29 as previously set forth.

The pan structure 114 may, therefore, be located about the heating element 12 whereupon the segmental bottoms 120, in cooperation with the terminal shield 36, catch any extraneous material which may pass through the grid-like heating element 12, and the ledges 172, through the cooperation of the ring-like members 115, support the heating element upon the range platform. The sloping bottoms 120 and terminal shield 36 permit the extraneous material to be readily drained from the modified surface unit 11 without any danger of such material contacting the terminals.

As hereinabove stated, the hinge structure 20, associated with the pan structure 14, is used with the modified pan structure 114 to permit the two half pan structures 162 and 164 to be rotatively attached together.

However, the snap clip structure 122 is slightly modified from the clip structure 22 associated with the pan structure 14. The clip structure 122 comprises an elongated finger 182 spot welded, for example, to the ring-like member 115 of the half pan structure 164. The free end of the finger 182 is bent outwardly to permit free and easy cooperation with the second half pan structure 162. An aperture 186 is located within the finger and cooperates with a crimped boss portion 184 in the ring-like member 115 of the half pan structure 162. The cooperation of finger 182 with the crimped boss 184 thus affords means for retaining the two half pan structures 162 and 164 in cooperative engagement about the heating element 12.

The modified terminal shield 136 is similar to the terminal shield 36 hereinabove described except that the depending ends 142 are a great deal shorter than the ends 42, inasmuch as they are not attached to the terminal block 132.

The terminal block 32 in the modified unit 11 is rigidly attached to the terminal shield 136 by a Z-shaped supporting member 143, which is preferably spot welded to the terminal shield 136 at its upper end and screwed to the terminal block 32 at its lower end. The member 143 is of such strength as to rigidly attach the terminal block 32 to the terminal shield 36 without any other attaching means. However, it is to be understood that the terminal block 32 and the method of attaching such block to the terminal shield may be suitably modified, if desired. The heating element 12, terminal shield 136, and terminal block 132 thus form a solid structure.

The modified elevating supporting ear structure 118 includes, in this instance, an inverted F-shaped structure positioned at one end of the terminal shield 136, comprising a vertically extending portion 154 and having, at the lower end thereof, a central outwardly extending horizontal upper lip portion 156 and two lower outwardly extending horizontal lips 160 and 161 at the lower end thereof (see Fig. 8). The upper end of the vertical portion 154 is rigidly attached to the depending end of the terminal shield 36 by spot welding, for example, thereto. The central outwardly extending horizontal lip 156 is formed substantially wider than the lower lips 160 and 161, and is positioned thereabove to cooperate with the upper surface of the ledge of the range platform 16 (see Figs. 3, 4 and 8). The lower lips 160 and 161 are positioned below the upper lip 156 and located one on either side thereof to cooperate with the lower surface of the ledge of the platform 16 to prevent the heating element 12 and the cooperating structure from tipping when such structure is in an elevated position with respect to the range platform 16.

The lip 156 is adapted to be bodily moved upwardly through a notch 21 in the inwardly extending ledge 19 of the range platform 16 as the unit 11 is elevated to its cleaning position above the platform substantially in a manner hereinabove described. However, due to the separation of the lower lips 160 and 161, such lips will contact the under surface of the ledge 19 as the unit is bodily moved into the elevated position and prevents the complete passage of the elevating support structure 118 therethrough. By rotating the unit slightly, so that the central lip 156 rests on ledge 19, the unit will be partially retained in its elevated position, the remaining necessary support being provided by spring clip 119, as subsequently set forth.

The supporting spring lip structure 119 is an irregularly V-shaped latch-like member rigidly attached to the second end of the terminal shield 136. Such structure is composed of a resilient metal which permits the clip 119 to snap about the ledge 19 in the platform 16 as the heating unit is lifted therethrough substantially as hereinafter described. A substantially horizontal retaining surface 140 is located near the lower end of the clip structure 119 for cooperating with and for resting upon the ledge 19 in the range plate 16.

The modified unit 11 is assembled substantially the same as the unit 10 hereinabove described, with the heating unit 12, terminal shield 136 including the ear structure 118 and spring clip 119, and terminal block 32 as a functionally integral structure. The pan structure 114 may then be located about the heating element 12 with the bottoms thereof located intermediate the heating element and the terminal shield to complete the modified surface unit 11.

Figure 3:
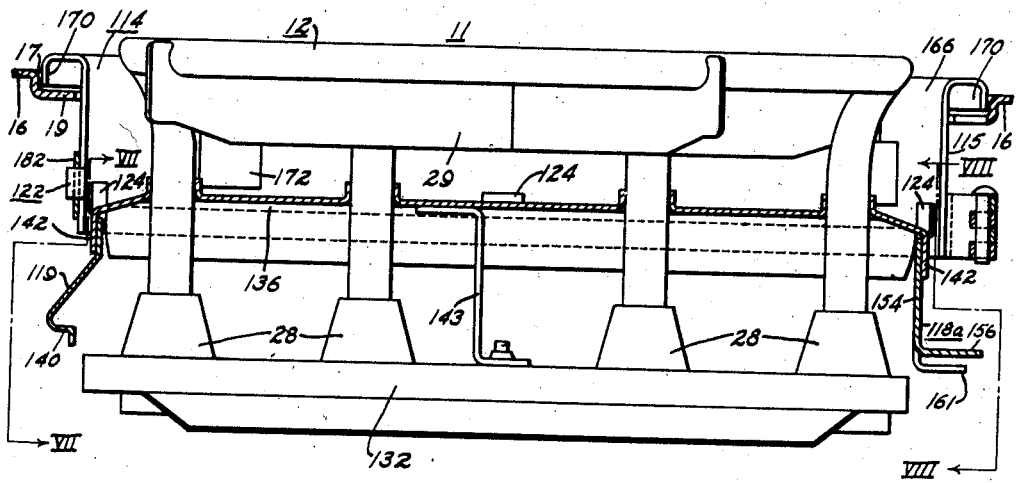
Figs. 3 and 4 are sectional views of a modified form of a device embodying my invention in its normal operating position, and in its elevated or cleaning positions, respectively.
Figure 4:
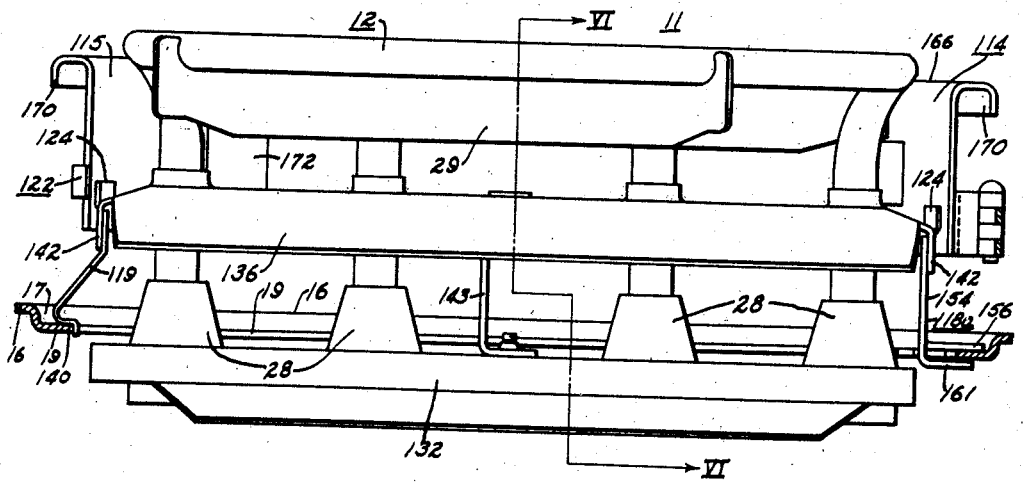

The pan structure 114 is located about the heating element 12, when such unit is in its normal operating position, as shown in Fig. 3, and is adapted to retain such heating element and associated structure, namely, the terminal shield 136 and the terminal block 32, upon the range platform 16 in the operative position in a well known manner. The elevating structures 118 and 119 are also adapted to cooperate with the range platform, or the like, for supporting the unit 11 in an elevated position upon the platform.

When it is desired to clean the modified unit 11 an operator angularly or partially lifts the unit through the aperture 17 so that the horizontal portion or upper lip 156 of the ear structure 118 is thus passed through the notch 21 (there being only one notch in this instance), whereupon the unit may be rotated within the aperture. After the surface unit 11 is partially elevated and rotated within the aperture 17 in the platform 16, with the upper lip 156 of ear structure 118 positioned upon the ledge 19, the unit 11 may be completely elevated. With such action, the spring clip 119 will first be biased inwardly by the ledge 19 and then, upon a continued elevation of the unit 11, snap out over the ledge 19. The retaining surface 140 will then rest upon the upper surface of the ledge 19 and retain the unit 11, in cooperation with the ear structure 118, in a displaced position above the range platform.

The pan structure 114 may then be removed from the heating element 12 by unbiasing the clip structure 122, permitting the two portions of the pan structure to rotate about the hinge structure 20. This action, in turn, permits the pan structure to be readily removed from the heating element and to be washed or cleaned in any desirable manner. After thoroughly and satisfactorily cleaning the supporting pan structure 114 and heating element 12, such pan structure 114 may be positioned about the heating element 12 with the clip structure 122 again reengaged to retain the half pan structures 162 and 164 in cooperative engagement about the heating element 12.

The unit 11 may then be returned to its operative position upon the range platform by biasing inwardly the spring clip 119, partially lowering the unit and rotating such unit 11, so that the upper part 156 of ear structure 118 may drop through the notch 21 within the ledge in the range platform 16. The unit 11 may then be completely lowered through the platform 16, whereupon the upper outwardly extending flange 170 of the pan structure 114 will rest upon the ledge 19 and retain the surface unit in its normal operating position upon the range platform in a well known manner.

It is, therefore, obvious that the range surface unit embodying my invention, which includes a removable supporting pan structure, may be easily retained in an elevated or cleaning position above the range platform, permitting such pan structure to be readily removed therefrom, and that accordingly, such pan structure and heating element may be easily cleaned without impairing the operation of the heating element in any manner whatsoever.

Referring to Figs. 18, 19 and 20, I show an additional modified hinged pan structure 214 in which the hinge structure is located directly under a portion of the pan. This arrangement permits the pan structure to be mounted upon and removed from a supporting platform 16 without requiring any tilting of the unit or the provision of any slot or notch within the edge of the aperture 17 for the free passage of the hinge structure.

The pan structure 214 is similar to the pan structure 114 having two ring-like side members 215 and segmental bottoms 220 which are attached to the ring-like members by tabs 124. A clip structure such as shown at 122 in Fig. 13 may be employed to secure the side members 215 together. A flat indented hinge retaining portion 224 is pressed into the lower portion of the side members 215 where it is desired to mount the hinge structure 20. The hinge retaining portion is pressed in, in this instance, along an inclined plane substantially 60° to the plane of the bottom 220. Accordingly, the axis of the hinge pin 81 is inclined to the surface of the surface unit and an extension of such axis does not contact the pan structure at any point, even though the hinge is positioned directly beneath the flange 70 of the pan structure. The two portions 262 and 264 of the pan structure 214 may then be rotated about the hinge pin 81 without causing any binding action between the two half pan structures.

It, therefore, follows that the angle of inclination of the hinge pin must be of such value that the axis thereof will not contact the pan structure at any point. However, such angle should be as close to vertical as possible to enable the pan structure to be freely removed from the heating unit when in an elevated position.

With the pan structure 214 positioned about the heating element 12 in a normal manner, such pan structure 214 will function substantially as herein above described. However, when the heating unit is elevated and it is desired to remove the pan structure 214, the two half pan structures 262 and 264 are separated, whereupon such structures will tend to drop down with respect to the heating element 12 (see dotted lines on Fig. 20). The amount of drop or inclination of the half pan structures will depend upon the inclination of the hinge pin 81, and such drop is limited by the supporting platform 16 and the cooperating terminal shield.

It is, therefore, obvious that a surface unit embodying my invention may be easily removed from its normal operating position, and that the pan structure included therein may be easily and quickly removed from the heating element, whereby such pan structure and element may be thoroughly cleaned and then readily replaced.

It will be seen that my "pan structure" is located about a heating element for normal support thereof. My pan structure preferably includes a ring-like member formed of one or more spaced or contiguous sections, the bottom being attached or otherwise associated therewith. Further, the bottom of such pan structure may comprise a plurality of solid or perforated segmentally or sectorially shaped sections which function independently or in combination with other portions of the heating unit assembly or the like to provide means for reflecting upwardly the initially downwardly directed heat and for guiding any spillage or sloppage of extraneous material falling thereon in a predetermined path away from the heating element terminals.

Various other modifications may be made in the device embodying my invention without departing from the spirit and scope thereof, and I desire, therefore, that only such limitations shall be placed thereon as are imposed by the prior art and the appended claims.

I claim as my invention:

1. In an electrically-heated structure for assembly to a range platform, the combination of a heating element arranged in a substantially horizontal plane adjacent the plane of the platform during normal use and movable to an elevated position for cleaning, said element including a depending terminal structure extending downwardly from the plane of the element and movable upwardly and downwardly therewith, a pan structure including a peripheral flange portion encompassing the element during normal operation and engaging said platform and a heat-reflecting bottom portion forming a drip pan and terminal shield and disposed at least in part below said element, said bottom portion of the pan being divided for defining complementary sections disposed on opposite sides of the depending terminal structure and hinge means for connecting said sections of the pan structure and affording separation of the sections when the heating element is in its elevated position to permit the pan structure including its peripheral and bottom portions to be removed from the element for cleaning.

2. In an electrically-heated structure for assembly to a range platform, the combination of a heating element arranged in a substantially horizontal plane adjacent the plane of the platform during normal use and movable to an elevated position for cleaning, said element including a depending terminal structure extending downwardly from the plane of the element and movable upwardly and downwardly therewith, a pan structure including a pair of complementary segments disposed on opposite sides of the depending terminal structure, each of said segments including a heat-reflecting bottom portion extending beneath the heating element and shielding the terminal structure, and each segment including a peripheral flange extending outwardly from said bottom portion and resting upon the range platform for the support of the pan structure, a plurality of supports carried by the bottom portion of the pan structure for supporting said heating element during normal operation, means movable with the heating element for supporting the same upon the range platform in the elevated position of the heating element and hinge means connecting the segments of the pan structure and affording separation thereof in the elevated position of the heating element and removal of the entire pan structure from the heating element.

3. Electrically-heated apparatus for assembly to a range platform, the combination of a heating element arranged in a substantially horizontal plane adjacent the plane of said platform during normal operation and adjustable upwardly to an elevated position for cleaning, a terminal structure depending from the element and movable therewith, means carried by the depending terminal structure and engageable with said platform for supporting the heating element in its elevated position, and a pan structure for supporting the element from the platform in normal operating position of the element, said pan structure including a pair of segments disposed on opposite sides of the terminal structure and each including a heat-reflecting, terminal-shielding bottom wall, an upwardly-extending wall and an outwardly-extending flange engaging the range platform during normal operation, projections carried by the upwardly-extending walls for supporting the heating element during normal operation, hinge means connecting the upwardly-extending walls of said segments and providing for separation of the segments when the element is in its elevated position so that the pan structure may be removed as a unit from the heating element and a clasp for maintaining the segments of the pan closed during normal operation.

4. A cooking device for assembly to a range platform, the combination of an electrically-heated element, generally circular in configuration and disposed in a horizontal plane adjacent the plane of the platform, a terminal structure depending from the element and extending diametrically thereof, a pan assembly disposed beneath the element and including complementary substantially semi-circular heat-reflecting segments disposed on opposite sides of the terminal structure, hinge means connecting said segments and permitting separation thereof for the removal of the pan assembly as a unit from the heating element, a flange disposed adjacent the top of the pan segments for supporting the pan assembly from the platform and supports carried by the segments for supporting said elements.

5. The combination as claimed in claim 4 wherein said hinge is disposed with its axis of movement oblique.

WILLIAM J. RUSSELL.